(12) United States Patent
Ranta

(10) Patent No.: US 6,832,093 B1
(45) Date of Patent: Dec. 14, 2004

(54) METHOD AND SYSTEM FOR RESTRICTING THE OPERATION OF A RADIO DEVICE WITHIN A CERTAIN AREA

(75) Inventor: Jukka Ranta, Salo (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/430,683

(22) Filed: Oct. 29, 1999

(30) Foreign Application Priority Data

Oct. 30, 1998 (FI) .................................................. 982363

(51) Int. Cl.$^7$ ............................................... H04Q 7/20
(52) U.S. Cl. .................... 455/456.4; 455/521; 455/565; 455/574; 455/422.1
(58) Field of Search ................................ 455/456, 410, 455/461, 446, 422, 550, 507, 428, 456.4, 521, 565, 574

(56) References Cited

U.S. PATENT DOCUMENTS

| | | | | |
|---|---|---|---|---|
| 5,224,150 A | * | 6/1993 | Neustein .................... | 340/7.44 |
| 5,442,805 A | * | 8/1995 | Sagers et al. ............... | 455/456 |
| 5,774,787 A | * | 6/1998 | Leopold et al. ............ | 455/12.1 |
| 5,778,304 A | | 7/1998 | Grube et al. ............... | 455/33.1 |
| 5,898,908 A | * | 4/1999 | Griffin et al. ............. | 455/127.2 |
| 6,011,973 A | * | 1/2000 | Valentine et al. ........... | 455/456 |
| 6,081,727 A | * | 6/2000 | Kondo ......................... | 455/522 |
| 6,085,096 A | * | 7/2000 | Nakamura ............... | 455/456.6 |
| 6,122,486 A | * | 9/2000 | Tanaka et al. ................ | 455/68 |
| 6,212,390 B1 | * | 4/2001 | Rune .......................... | 455/456 |
| 6,230,017 B1 | * | 5/2001 | Andersson et al. ......... | 455/456 |
| 6,584,319 B1 | * | 6/2003 | Girod ...................... | 455/456.1 |
| 6,625,455 B1 | * | 9/2003 | Ariga .......................... | 455/565 |

FOREIGN PATENT DOCUMENTS

| | | |
|---|---|---|
| GB | 2320134 | 6/1998 |
| WO | WO 97/22049 | 6/1997 |
| WO | WO 97/29607 | 8/1997 |
| WO | WO 98/25433 | 6/1998 |
| WO | WO 98/37722 | 8/1998 |
| WO | WO 99/07167 | 2/1999 |

OTHER PUBLICATIONS

Timothy J. Klandurd, Beacon control of radio transmitters to reduce radio frequency interference, Aug. 1992, Motorola Inc. Technical developments vol. 16, 130–132.*
Patent Abstracts of Japan, document No. JP 7231472.
"Beacon Control Of Radio Transmitters To Reduce Radio Frequency Interference", Klandrud et al., Motorola Technical Developments, vol. 16, No. 16, pp 130–132, 1992.
Finish Patent Application No. FI 972813 and English Translation Thereof.

* cited by examiner

*Primary Examiner*—Erika Gary
*Assistant Examiner*—Sheila Smith

(57) ABSTRACT

A cellular radio system comprises a multitude of base stations (101–106, 201–204, 211–212, 501–504) for offering a radio interface to mobile terminals (205, 215, 508). The radio interface is used for communicating general information to the mobile terminals and arranging for dedicated communication between a certain mobile terminal and the cellular radio system. For imposing restrictions to the operation of the mobile terminals on at least one isolated, geographically defined restricted area (107, 108, 200, 213) the system comprises a certain first base station arranged to transmit, similar to said general information, information about the nature of the restrictions applicable on said area to the mobile stations.

18 Claims, 4 Drawing Sheets

US 6,832,093 B1

METHOD AND SYSTEM FOR RESTRICTING THE OPERATION OF A RADIO DEVICE WITHIN A CERTAIN AREA

TECHNOLOGICAL FIELD

The invention concerns in general the technology of forcing a radio device to operate in a certain way by external means. Especially the invention concerns the problem of subdueing the noticeable operation of mobile terminals in certain parts of a cellular radio system.

BACKGROUND OF THE INVENTION

In addition to and despite of offering remarkable advantages in the form of mobile communications, radio devices are sources for potential harm ranging from annoyance to serious life hazard. An example of the former is a mobile telephone alarm sounding in the middle of a concert, a theatre show or other event where the audience is expected to remain essentially silent. A life hazard may follow if a radio device emits electromagnetic radiation in an aircraft, near life-critical medical equipment or in the vicinity of electrically triggered explosives. Warning signs or acoustic announcements that ask all users to shut down their radio devices offer only a partial solution to this problem, because they do not prevent absent-minded users or deliberate violators from ignoring the request.

A group of prior art solutions for the problem is previously known from the patent publication number WO 97/22049. The publication contains a thorough description of an electronic device that comprises, among its other features, means for sensing the occurrence of a take-off or landing when used inside an aircraft. The first alternative embodiment is to provide within the electronic device a predetermined number of sensors for detecting movement and acceleration. Another embodiment comprises a separate transmitter inside the aircraft for transmitting, as a response to a command given by an airline employee, a signal that is received by a receiver in the electronic device. In a third embodiment the electronic device comprises also a transmitter for emitting a signal that would notify the aircraft of the presence of the electronic device. A corresponding transmitter in the aircraft would then transmit an inhibit signal to the electronic device during take-offs and landings. In any case, when the electronic device produces a positive observation of a take-off or a landing taking place, it powers down all such functions that could cause dangerous electromagnetic emissions.

Some similar solutions are known from the Finnish patent application number 972813. It describes a mobile telephone that comprises, in addition to its conventional functional blocks, a separate radio or infrared receiver for receiving inhibit signals from a local transmitter. Whenever the separate receiver receives an inhibit signal at a power level that exceeds a certain threshold, it powers down the transmitter part of the conventional transceiver and set the mobile telephone into silent mode, where no audible alarms or keypad tones will be emitted.

The drawbacks of the mentioned prior art solutions are related to the excessive need of devices and components that must be added to the existing systems to make the operational restrictions work. A manufacturer of radio devices may be very reluctant to increase production costs by adding into his product features that actually weaken the level of service that the user of the radio device will get. An inhibit signal transmitted in the form of infrared radiation is also vulnerable to the infrared receiver in the electronic device being dirty, covered or adversely directed so that the inhibit signal will not be received correctly.

SUMMARY OF THE INVENTION

It is an object of the present invention to provide an economically attractive and functionally reliable solution to the problem of restricted area operation.

The objects of the invention are achieved by using the conventional functional blocks of mobile terminals for implementing the restricted operation mode.

It is characteristic to a system for restricting the operation of radio devices according to the invention that for imposing restrictions to the operation of the mobile terminals on at least one isolated, geographically defined restricted area it comprises a certain first base station arranged to transmit, similary to other general information, information about the nature of the restrictions applicable on said area to the mobile stations.

Additionally the invention concerns a method, comprising as its characteristic features the steps of providing a radio interface for the mobile terminal through a number of base stations, using said radio interface for general broadcasts on a common downlink channel and transmitting, similar to said general broadcasts, information about the nature of the restrictions applicable on said area.

According to the invention, restrictions will be placed to the operation of mobile terminals of a cellular radio system in a certain region. The invention provides two ways of defining these so-called "restricted areas"; said two ways may be used either independently or as complementing each other. The first way is to use, within the restricted area, a predetermined number of beacon base stations. A beacon is a base station that is able to communicate information to the terminals like all other base stations in the cellular radio system but allows only restricted operation to the mobile terminals within its cell. The second way of defining a restricted area is to use coordinates that mark off a certain two- or three dimensional physical region. It is also possible to add a further dimension to the definition by giving time coordinates. The base stations of the cellular radio system that are physically close to the restricted area will most advantageously transmit the coordinates of the restricted area to all mobile terminals, although this is not mandatory to the invention. A separate terminal location system will provide location information for each terminal, and when the location information indicates that the mobile terminal is within the restricted area, operational restrictions will apply.

The two ways of defining a restricted area may be combined so that the coordinates of the beacon base stations and the radii of their cells will be used as the coordinates defining the restricted areas, whereby it will be possible to announce the existence and location of the restricted area(s) to a mobile terminal even if it is not yet entering a restricted area.

The restrictions that will be placed to the operation of the mobile terminals may vary according to need. We will categorize them into two classes, which are restrictions affecting the emission of electromagnetic radiation and restrictions affecting the human-noticeable operation of the terminal.

A major part of the former class is formed by ways of limiting the normal operation of the transmitter part in the mobile terminal's radio transceiver, i.e. limiting or inhibiting uplink radio transmissions. The latter class will consist mainly of restrictions to acoustic emissions such as ringing sounds and keypad tones.

A terminal which is about to enter or entering a restricted area may inform its user and/or the network about the situation. During restricted operation the terminal and/or the network may execute procedures aiming at minimizing the loss of information due to the restrictions; examples of such procedures are the direction of incoming calls to a voice mail service and the reception and storage of paging messages in the terminal for indicating to the user the time of an attempted call and the possible identification of the caller.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 1:
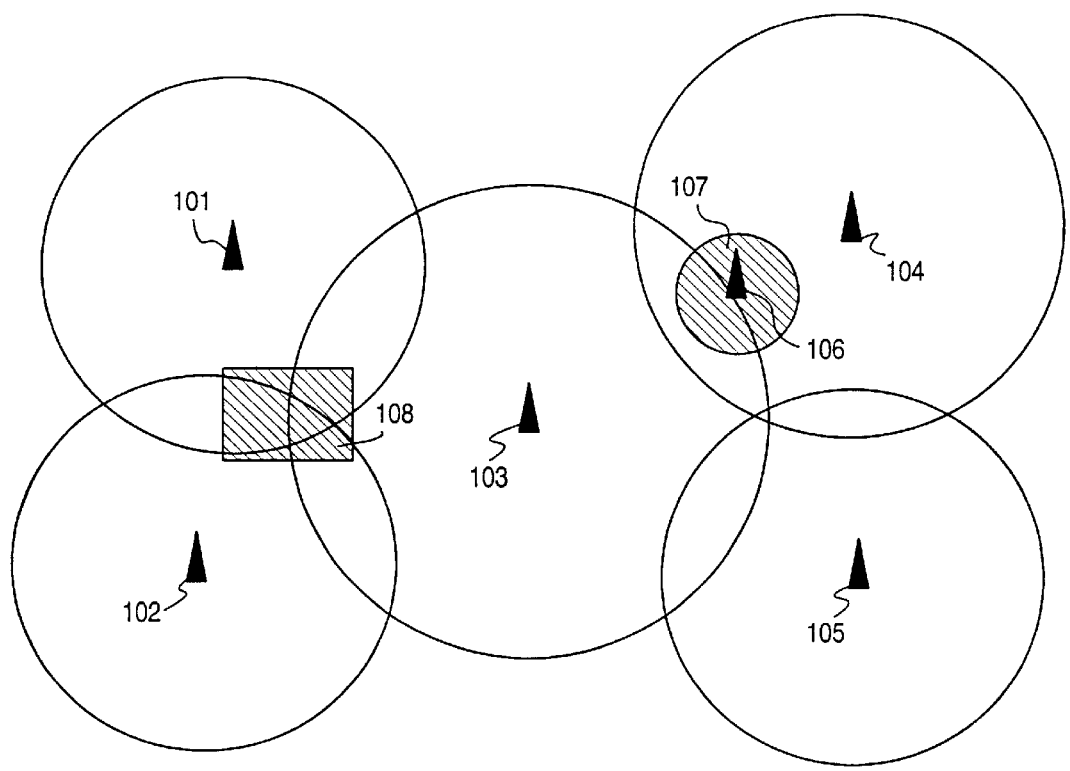
FIG. 1 illustrates schematically two possible forms of restricted areas.

FIG. 1 illustrates a part of a cellular radio system comprising a number of base stations 101, 102, 103, 104, 105 and 106. Of these, the base stations 101 to 105 are normal base stations of the cellular radio system in the sense that they offer a two-way radio interface to mobile terminals according to the specifications of the cellular radio system. Such a radio interface comprises a plurality of defined channels, the exact arrangement and usage of which is specific to each cellular radio system. In this patent application we will use the known GSM (Global System for Mobile telecommunications) as an example, but the reader should note that the applicability of the present invention is in no way limited to any specific current or future cellular radio system. A cellular radio system is often referred to as a "network" for brevity. In contrast to the base stations 101 to 105, base station 106 is a so-called beacon base station. A cell or coverage area surrounds each base station as an essentially circular geographical area inside of which it is possible for the mobile terminals to communicate with the base station.

The radio interface offered to mobile terminals in the cells of a GSM system consists of a number of common channels and a number of dedicated channels. The basic pattern of operation for a mobile terminal in a certain cell is first to acquire synchronisation by looking for and receiving downlink bursts on an FCCH (Frequency Control CHannel) and an SCH (Synchronisation Channel) and then to start listening for general information on a downlink BCCH (Broadcast Control CHannel) for selecting a suitable cell on the basis of received signal strength on the BCCH and of some additional criteria. After having selected a cell the mobile terminal initiates a location update to the selected cell by sending an access request on an uplink RACH (Random Access Channel). Finally the mobile station settles down in the selected cell waiting for a paging message on a PAGCH (Paging and Access Grant Channel); for the purposes of a mobile-originating call it may also transmit a new access request on the RACH. All the mentioned channels are common channels. A succesful access request is followed by the assignment of a dedicated channel for the bidirectional point-to-point exchange of information between the mobile terminal and a base station. The dedicated channel is a TCH (Traffic CHannel) of some kind—there are a number of TCH types differing in capacity—and it comes with an SACCH (Slow Associated Control Channel) which is also a dedicated channel.

The GSM system employs time and frequency division for separating the different channels. In other cellular radio systems it is possible to use, in addition to or instead of time and frequency division, for example code division. The invention does not limit the way how the different channels are separated from each other.

Two restricted areas 107 and 108 are shown in FIG. 1. The first restricted area 107 is circular and essentially coexistent with the cell of the beacon base station 106, and the second restricted area 108 is an essentially rectangular geographical area located partly in each of the cells of the normal base stations 101, 102 and 103. As a generalisation, we may state that in the system illustrated in FIG. 1, there may be an arbitrary number of restricted areas, defined as spanning the cells of a predetermined number of beacon base stations or as some geographical forms including but not being limited to rectangles. The restricted areas may be partly or even completely outside the cells of the normal base stations and they may overlap each other.

We will first describe the beacon alternative. The term "beacon base station" should not be confused with the concept of beacon frequency, which corresponds to a constant signal or a signal of known frequency transmitted by all base stations in some cellular radio systems for the purpose of synchronisation and/or received signal strength measurement by the mobile terminals. In the following description we will assume that for a certain type(s) of mobile terminals there exists at least one specified restricted mode of operation. The detailed contents of such a restricted mode will be described later; for the purpose of the present discussion it suffices to know that a mobile terminal may enter and leave a restricted mode under the influence of a beacon base station.

According to a first advantageous embodiment a restricted area is equipped with one or more beacon base stations so that the cell(s) of the beacon base station(s) cover the restricted area. The transmission power of the beacon base station is typically low compared to that of a regular base station, because the physical size of a restricted area is typically smaller than the cell of an average regular base station. In order to achieve the object of the invention it is required that once a mobile terminal enters the restricted area, it performs a cell selection (in the cases of power-on within the restricted area), a cell reselection (in cases of a mobile terminal being in idle mode upon entering) or a handover (in cases of a mobile terminal being in the middle of a call upon entering) to the cell of the beacon base station. This is accomplished by setting the transmission power of the beacon base station to such a level that a receiver located within the restricted area will receive the signal transmitted by the beacon base station at a considerably higher level than the signal transmitted by any regular base station. At the same time it may be necessary to make sure that the receivable signal levels from regular base stations stay under a certain limit, because in some cellular radio systems unnecessary cell reselections are to be avoided so that if a mobile terminal is communicating with a regular base station while entering the restricted area, it may not perform a cell reselection to the cell of even a considerably higher-level beacon base station if the signal level received from the regular base station is high enough to facilitate a reliable connection.

In the GSM system the cell selection and reselection procedures are governed by the calculation of the so-called C1 and C2 variables as well as some additional criteria like cell reselection hysteresis. A detailed description of the cell selection and reselection algorithms is given in the Technical Specification GSM 05.08, section 6 published by ETSI (European Telecomunications Standards Institute), which is incorporated herein by reference. Taken in the context of GSM, the above-described dimensioning of signal levels of base stations translates approximately to the requirement that the C1 variable calculated for the beacon base station(s) within the restricted area must be positive and higher than the C1 variable of any other cell found by the mobile station in the same location area, or in different location areas of the same network corrected by the applicable handicap factor. In order to recapture to the cell of the beacon base station(s) those mobile terminals that inadvertently reselect a regular base station while they remain within the restricted area, it may be advantageous that the C1 variable calculated for the beacon base station(s) is higher than the C1 variable of other cells by the amount of the applicable cell reselection hysteresis. Inadvertent reselection of a regular base station may follow from a mobile terminal passing through a certain zone within the reatricted area where e.g. disadvantageous interference conditions cause a temporary fadeout in the signal transmitted by the beacon base station(s).

In order to set the mobile stations to the restricted mode after they have selected the cell of a beacon base station, it suffices to arrange the operation of the beacon base station in a suitable way. The operation of base stations and the procedures executed by mobile terminals after cell selection or reselection vary from one cellular radio system to another, so the arrangements in the operation of the beacon base station must be selected according to which system the invention is applied to. Another important factor is the nature of the restricted mode: according to one alternative the mobile terminals must refrain from all radio transmissions inside the restricted area, whereby even location update attempts are forbidden; according to another alternative location updating and other channel access requests are allowed but actual mobile-originated calls must be withheld; there is even the alternative of fully allowed two-way operation within the restricted area but with strictly limited transmission power. If the restrictions applied within the restricted area are merely acoustic, the operation of the beacon base stations is again different. We will briefly consider all these alternatives in the following.

Total barring of all radio transmissions means that a mobile station looking for a suitable time interval and frequency for transmitting its first access request must be kept from finding one. It is possible that the common channel transmissions from the beacon base station convey to all mobile terminals a specific command to refrain from requesting access, but such a solution works only with those terminals that have been programmed to obey such a command. It would be very advantageous if the invention could be applied so that even the oldest and simplest mobile terminals would automatically obey the restrictions, just by operating according to the basic specifications of the cellular radio system and without actually even knowing that they are within a restricted area. For this purpose the beacon base station may e.g. define the RACH or a similar access requesting channel in a way that is incomprehensible to the mobile terminals or impossible for them to apply.

Allowing location update requests and other channel access requests but rejecting mobile-originating calls is easy, because all the beacon base station has to do is to refrain from granting dedicated channels for mobile-originated calls. To the mobile terminal such a situation is identical to the known one where the base station of the currently selected cell is so loaded that there are no free traffic channels that could be allocated. Most mobile terminals will perform the initial location update at the border of the restricted area upon entering, so defining the restricted area so that it actually covers a slightly larger area than where sensitive targets actually exist it will be rather well ensured that the location updates will only take place at the "safe zone" encircling the actual hazard area. However, it is possible that a mobile terminal will be switched on well within the restricted area and even in the immediate vicinity of a sensitive target, whereby it will perform its initial location update at a hazardous location.

Allowing location updates but rejecting all calls, both mobile-originating and mobile-terminating, is easy and implements in a very simple way a "concert hall" embodiment of restricted areas: a cell where all mobile terminals may operate and where no mobile terminal will ever alarm about an incoming call during the show. The beacon base station simply rejects the call setup requests coming from the network by giving some previously known reason, e.g. "no channels available". No changes are required to the terminals or the other parts of the network. Such a beacon base station may well operate according to a time schedule and/or according to the position of a manually settable switch so that for the most of the time it is a regular base station and for the time of concerts, rehearsals etc. it is set to the "dummy mode" where it operates otherwise normally but keeps all dedicated channels continuously marked as "reserved".

Also allowing two-way traffic with strictly limited power levels is easy, because in virtually all modern cellular radio system a procedure exists for dictating to the mobile terminals the limits of allowed transmission power within a certain cell. If the allowed transmission power level is very low and the mobile terminal is far from the beacon base station, it may become impossible to maintain a sufficiently error-free uplink connection. In such cases the terminal may enter a so-called one-way restricted mode, which we will discuss later in the detailed description of restricted mode operation.

Imposing such limitations to the acoustic emissions of the mobile terminals that should be realised by changes in the settings of the terminals requires invariably that the beacon base station transmits a corresponding command which the mobile terminals have been programmed to obey. Consequently, in the context of acoustic restrictions the invention is only applicable if the cellular radio system comprises suitably equipped terminals; we will describe these later.

An advantageous feature of a beacon base station is the fact that the party responsible for the operation of the restricted area may choose, whether a certain beacon base station should have a communication connection to the rest of the cellular radio system or whether it is just a "dummy" standalone transmitter that transmits the necessary signals but is completely incapable of conveying any exchange of information in the direction of the network. The latter alternative is very advantageous in remote and/or moving environments like aircrafts. It is probably also favorable in terms of production and installation costs, because it does not comprise any TRUs (TRansmission Units) that normally connect a base station to a Base Station Controller or generally a Radio Access Network, and because for installation it only requires a connection to a power supply. Using a suitably programmed and equipped conventional-type base station as a beacon base station is necessary if the restricted mode is to allow two-way communications (with possibly a limited power level) between the mobile terminals and the network or one-way transmission of information from the network to the mobile terminals. A network-connected beacon base station may also operate according to a predefined time schedule so that for some part of time (e.g. during a concert) it is a beacon base station and for the rest of the time it is a regular base station, thus adding a time coordinate to the definition of the restricted area. Naturally also a stand-alone beacon base station may be functional only for a part ot the time, whereby during non-restricted time periods its cell does not exist and the mobile terminals operate in those cells which overlap the restricted area.

If there are more than one cellular radio system operative within roughly the same area so that subscribers of any one of them may enter the restricted area, the beacon base station(s) must be arranged to transmit so that all mobile terminals of all overlapping cellular radio systems are able to select the cell of a beacon base station.

The use of a beacon base station in the middle of an area where radio transmissions should be restricted may sound contradictory, because a beacon base station will by its nature produce radio transmissions. However, it is rather straightforward to take the necessary precautions against a radio transmission for which the timing and frequency characteristics are previously known. A part of the procedure of establishing a restricted area based on beacon base stations must be the protection of any sensitive devices within the restricted area against the effects cause by the beacon base stations.

Next we will describe the alternative of defining the restricted area by giving its coordinates, which is the case for the restricted area 108 in FIG. 1. The invention does not limit the size or shape of such a restricted area. If the restricted area is a rectangle, it suffices to announce the coordinates of two opposite corners. For a general rectangular restricted area comprising an arbitrary number of corners it is possible to announce the coordinates of all corners; an alternative is to conceptually divide the rectangular form of the restricted area into a number of primitive rectangles and define each of them by giving the coordinates of two opposite corners. Such a definition is easily generalized to cover any two-dimensional areas limited by an arbitrary number of linear segments that intersect each other at arbitrary angles. A circular restricted area is easily defined by giving the coordinates of its center and the length of its radius. The physical shape of the restricted area may be even three-dimensional, taking the form of a rectangular prism, a sphere, a cone, a cylinder or some arbitrary three-dimensional object. Classical Euclidian geometry provides easily applied definitions for as to how many coordinates must be given to unequivocally define any selected shape. A time coordinate may be applied by defining a time interval during which the restrictions are in force or during which the restrictions are not in force.

Irrespective of the shape of the restricted area, its coordinates must be in the knowledge of at least one cellular radio system. Restrictions for the use of mobile terminals usually apply equally well to everybody, so in areas where there are overlapping cellular radio systems the coordinates of a restricted area must be known to each system.

An important part of the embodiment based on the announced coordinates of the restricted area(s) is the provision of location data for each mobile terminal. The invention does not limit the way through which such location data will be obtained. There are several known ways for locating a mobile terminal, such as those described in the Finnish patent applications number 974153 and 974196, which are incorporated herein by reference. Most location methods described in said patent applications are so-called OTD-methods (Observed Time Difference) or TDOA-methods (Time Difference Of Arrival) which means that either the mobile terminal or the network or both measure the arrival times and/or time difference between the arrivals of certain radio signals through at least three base stations. When the locations of the base stations and the propagation velocity of radio waves are known, it is possible to calculate the location of the mobile terminal from the observed time factors. A certain Location Service Center (LSC) maintains a location database in the network.

An additional applicable method for locating a mobile terminal is known from the co-pending Finnish patent application "Menetelmä ja järjestely matkaviestimen paikantamiseksi", which is also incorporated herein by reference. In the method described therein a simple low-power transmitter is installed at a known location and programmed to transmit regularly an identification signal. The transmission power of the simple transmitter is low enough and its coverage correspondingly small enough so that a mobile terminal that is able to receive its transmission may be regarded to be essentially at the same location as the simple transmitter. When the mobile terminal has received a low-power transmission from a simple transmitter, it transmits to the network a message indicative of the successful reception of the identification signal contained in the transmission. On the basis of said message the network finds out and stores the known location of the mobile terminal. If the network knows the location coordinates of the identified simple transmitter, it may inform the mobile terminal by sending a message like "you have received the transmission of the simple transmitter ABC, so you are at location XX, YY, ZZ". Another alternative is that the simple transmitter does not transmit an identification signal but simply the coordinates of its location at a low transmission power, whereby a terminal that is able to receive its transmission may regard itself as being essentially at the indicated location.

In the future it is possible that every mobile terminal comprises a built-in positioning subsystem like the GPS (Global Positioning System) receivers known today. In such a case it is very straightforward for every mobile terminal to known its location, because it gets the necessary information regularly from the positioning subsystem.

The present invention encompasses two procedural alternatives within the embodiment of announcing the restricted areas in the forms of coordinates. The alternatives could be called the mobile-based and the network-based alternative. According to the mobile-based alternative at least one base station of each affected cellular radio system transmits the coordinates of the restricted area(s) in a common channel transmission so that every mobile station in the cell may receive them. It is advantageous to transmit the coordinates of the restricted area through at least each such base station in the cell of which a mobile station may be camping at the time when it enters the restricted area. In the example of FIG. 1 this corresponds to transmitting the coordinates of the restricted area 108 through base stations 101, 102 and 103. Transmitting the coordinates through only some of said base stations may result in a situation where a mobile terminal enters the restricted area without having any knowledge about its existence. Transmitting the coordinates through other base stations is possible but not advisable if unnecessary transmissions in the network should be kept at minimum in order to save transmission capacity and reduce interference.

In the mobile-based alternative the positioning system that provides and maintains the location information of the mobile stations may function independently. It is required, however, that the positioning system communicates the location information regularly to each mobile terminal. It is then on the responsibility of the mobile terminal to compare the latest location information to the announced coordinates of the restricted area. If the comparison shows that the mobile terminal is within the restricted area, it is further on the responsibility of the terminal to enter the restricted mode. Similarly when a later comparison shows that the mobile terminal is not any more within the restricted area, the mobile terminal may give itself a permission to resume normal operation.

In the network-based alternative it is not necessary to provide the mobile terminals any information at all about their location. The location information of each mobile terminal resides within the network, preferably within a Location Service Center. The network will also inform the Location Service Center (or any other network element possessing the location information of at least one mobile terminal) about the coordinates of the restricted area(s). It is then on the responsibility of the Location Service Center (or said other network element) to compare the location information of each known mobile terminal to the coordinates of the restricted area(s). If the comparison shows that a certain mobile terminal is within a restricted area, the network must generate and transmit to the mobile terminal the command "You are within a restricted area; please enter restricted mode". Similarly when a later comparison shows that the same mobile terminal is not any more within the restricted area, the network must generate and transmit to the mobile terminal the command "You have left the restricted area; please resume normal operation". Generating and transmitting messages from the network to a specified mobile terminal or a specified group of mobile terminals is a technique known as such to the person skilled in the art.

Figure 2A:
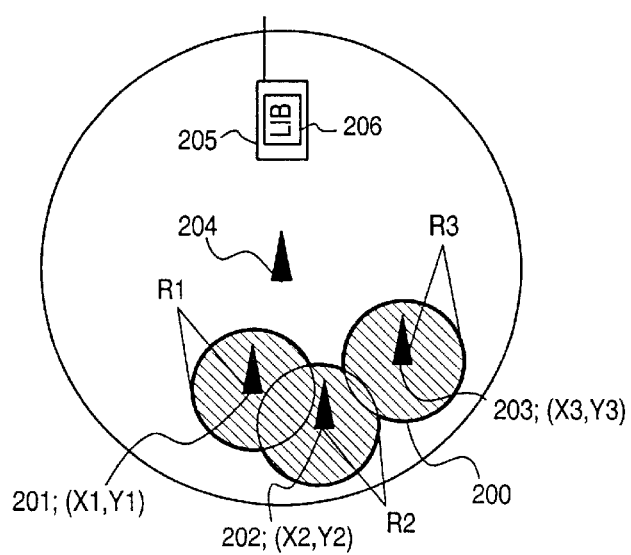
FIG. 2a illustrates a certain arrangement of restricted areas.
Figure 2B:
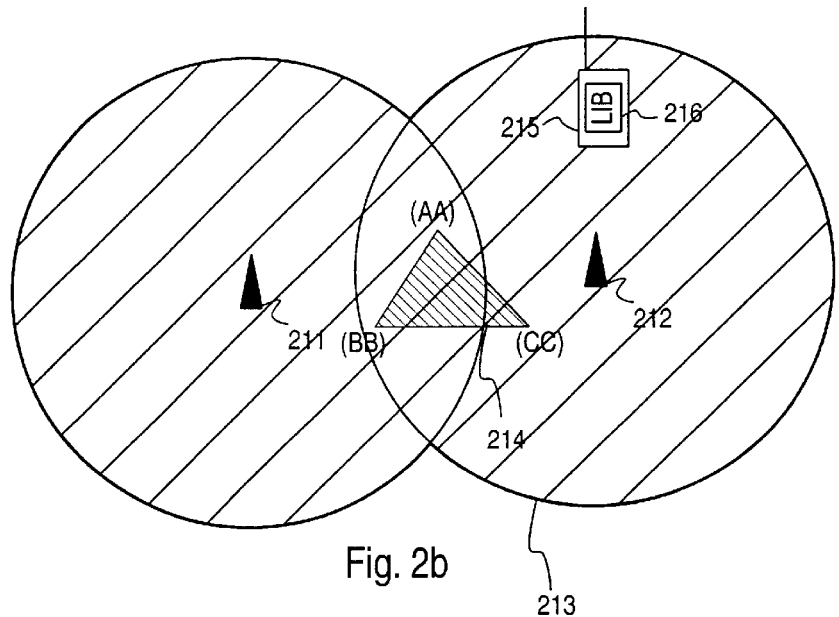
FIG. 2b illustrates another arrangement of restricted areas.

It is possible to combine the above-described "beacon base station" and "coordinates" embodiments in many ways. Some of these ways are illustrated in FIGS. 2a and 2b. In FIG. 2a, there is a restricted area 200 that consists of the cells of the beacon base stations 201, 202 and 203 located at the coordinate points (X1, Y1), (X2, Y2) and (X3, Y3) respectively. The radii of the cells are R1, R2 and R3 respectively. A nearby regular base station 204 transmits in a common channel transmission the coordinate set "(X1, Y1), R1; (X2, Y2), R2; (X3, Y3), R3" so that a terminal 205 within the cell of the regular base station will be informed about the existence of the restricted area 200 even before it is close enough to it for receiving the transmission of one of the beacon base stations 201, 202 or 203. A location information block (LIB) 206 within the mobile terminal may make a comparison between the announced coordinates of the restricted area and warn the user of the mobile terminal about the proximity of a restricted area. However, comparisons made in the location information block will not make the mobile terminal to enter the restricted mode; this will only happen as a response to a cell selection or reselection to the cell of one of the beacon base stations 201, 202 or 203.

FIG. 2b illustrates the concept of nested restricted areas realised through the simultaneous use of the "beacon base station" and "coordinates" embodiments. Here the cells of the otherwise regular base stations 211 and 212 also form an outer restricted area 213 where some minor restrictions apply, e.g. mobile stations are only allowed to transmit with transmission powers below a certain limit. Within the cells there is a triangular inner restricted area 214 where all radio transmissions are forbidden. Both base stations 211 and 212 transmit, in a certain common channel transmission (a separate common channel for each cell) the coordinates AA, BB and CC of the vertexes of the inner restricted area. A mobile station 215 within the outer restricted area operates under said minor restrictions, but at the same time a location information block 216 monitors the location of the mobile terminal and is ready to shut down all radio transmissions at the moment when the location of the mobile terminal is found to fall within the inner restricted area.

It is naturally possible to realise the concept of nested restricted areas by using solely beacon base stations or solely coordinates. It is also possible to have an inner restricted area marked with beacon base stations within an outer restricted area announced by coordinates. It is further possible to define two partly or completely overlapping restricted areas, one of which is marked with beacon base stations and the other announced with coordinates. Additionally it is possible to have stricter restrictions in force within the outer restricted area and define one or more inner restricted areas as "islands" of minor restrictions. Although the concept of nested restricted areas has been described with only two alternative levels of restrictions, it is possible to define an arbitrary number of restriction levels and establish an arbitrary number of overlapping or nested restricted areas with variable levels of restriction.

We will now move on to describe the operation of the mobile terminal and the base station during the restricted mode and immediately therebefore or thereafter. We will start by discussing the possible restrictions affecting the emission of electromagnetic radiation. As stated previously, these may be further classified to limited two-way operation where uplink transmissions are allowed with limitations regarding for example the transmission power or scheduling, and one-way operation where the mobile terminal is only allowed to receive. Changes between these two classes may occur: a mobile terminal which is not able to realize a reliable uplink connection with a certain transmission power level even if it would be allowed to will enter the one-way mode and possibly resume two-way operation later if the transmission characteristics of the uplink connection improve significantly.

If limited two-way operation is allowed during the restricted mode and the limit on the uplink power is tight, the mobile terminal may consider changing its uplink transmission parameters if this is otherwise allowed in the system. For example some proposals for future cellular radio systems allow for several modulation methods to be used, one of which may be slow but error-resistent while another is able to communicate more bits per unit time but requires a better signal-to-noise ratio. In the limited transmission power mode a mobile terminal might choose the first one in order to get at least some uplink data through to the base station. Also added channel coding or simple repetition might be used.

Even if all uplink transmissions are forbidden or impossible at the allowed power level, the mobile terminal will be able to receive downlink transmissions (only in rare occasions will even the negligible stray radiation caused by spurious mixing results propagating from the receiver branch to the antenna cause trouble, whereby a complete shutdown would be required). The problem is then that if the network transmits a paging message, an SMS message, a piece of electronic mail or some other message to the mobile terminal, in the absence of acknowledgements it will not know whether the transmission got through or not. In the case of paging messages the network may operate exactly as if the mobile terminal had been shut off or out of coverage: it will play a recorded message to the caller indicating that the called party could not be reached. However, if the mobile terminal has upon entering the restricted area informed the network about the situation (or if this information has been generated in the network by other means), the network may play a different message to the caller indicating that the called party is within a restricted area and asking to wait for a while. If the paging message got through, the called party will be alerted and he may try leaving the restricted area and answer the call before the caller hangs up. In any case the CLI or Calling Line Identity code of the caller was stored in the mobile terminal if the paging came through, so the called party will be able to call back after leaving the restricted area.

According to one advantageous embodiment the mobile terminal that is not able to communicate in the uplink direction will store the acknowledgements it should have sent and automatically transmit them to the network at the first possible occasion after leaving the restricted area. According to a further embodiment of the invention the network may try repeating all transmissions to mobile terminals in restricted areas in order to ensure successful reception in the absence of acknowledgements. Such repeated downlink transmissions will increase the probability of successful reception but also use transmission capacity and cause interference in the network, so their use should be restricted to situations where such effects are not considered to be too detrimental to the overall operation of the cellular radio system.

It is always possible that the user of the mobile terminal is in the middle of a telephone conversation or otherwise actively using his terminal for communication at the time when he is entering the restricted area. If the restricted area is such where the restrictions should be strictly enforced, it is possible for the mobile terminal and the base station to cut out the communication immediately when it has been established that restrictions apply. Another possibility is to announce to the user, in the form of a text message or a voice message superimposed with the voice connection in a telephone call, that he is entering a restricted area and the call should be terminated (or that it will be terminated by the system in ten seconds or other suitable time). If the restricted area has been defined through the use of beacon base stations, such an announcement could be made as soon as the mobile terminal has recognised one of the base stations which it considers as candidates for handover as a beacon base station (if such recognition is possible). If the coordinate definition has been used, the announcement could be generated as a response to the mobile terminal moving closer to the border of the restricted area than a predetermined threshold value.

Next we will discuss the possible restrictions affecting the acoustic emissions of the mobile terminal. It is possible to treat all kinds of acoustic emissions separately, but because the disturbance to the environment will be the same regardless of whether the actual emission is an alerting sound, a keypad tone, a sound associated to a recreational game or some other sound, we will treat them all under the general definition "acoustic emissions". The simplest restriction is to have all acoustic emissions either on or off. A more sophisticated embodiment of the invention encompasses a range of variations, like "total silence", "short and soft beep only", "normal tones but very soft", "normal tones but half volume" and "normal". It would be on the responsibility of the network to inform the mobile terminals about which level of acoustic restrictions will apply within each restricted area. By slightly extending the idea of "restricting" we may also provide an embodiment of the invention where the "restricted" area is one with a generally very noisy environment, whereby the acoustic "restriction" could be understood as a command for using increased volume setting for all acoustic emissions.

Next we will describe shortly the possibilities of informing the user of a mobile terminal about the existence of restricted areas. Here we must differentiate between such mobile terminals that have been constructed and/or programmed with the restricted mode operation in mind and those conventional mobile terminals that are forced into restricted mode by making them select a cell where normal operation is impossible. The latter class of mobile terminals may not be required to perform any operations that are not specified in the basic technical specifications of the cellular radio system they operate in. If the network and/or a standalone beacon base station finds out that such a terminal is within the restricted mode, it may try generating and transmitting to the terminal an SMS message or other message that has been defined in the specifications and that will produce an indication to the user that he is in restricted area. More versatility is given if we may suppose that the mobile terminal may be programmed to perform some previously nonspecified operations. A natural minimum requirement is that while the mobile terminal is in restricted mode, it produces an indication to the user about the situation for example as a short character string or a graphical symbol on a display.

In some cases it will be possible to predict the entrance of a mobile terminal into a restricted area. This is especially applicable in context of the "coordinate" embodiment, where the mobile terminal and/or the network is aware of the existence of the restricted area and the distance between the mobile terminal and the border of the restricted area well before actually entering. It is possible for the mobile terminal and or the network to monitor the trend in the distance and produce a warning like "by continuing in this direction with this velocity you will enter a restricted area in 2 minutes and 30 seconds". Such a warning may be displayed or otherwise communicated to the user as a character string, a graphical symbol and/or an audible warning.

Figure 3:
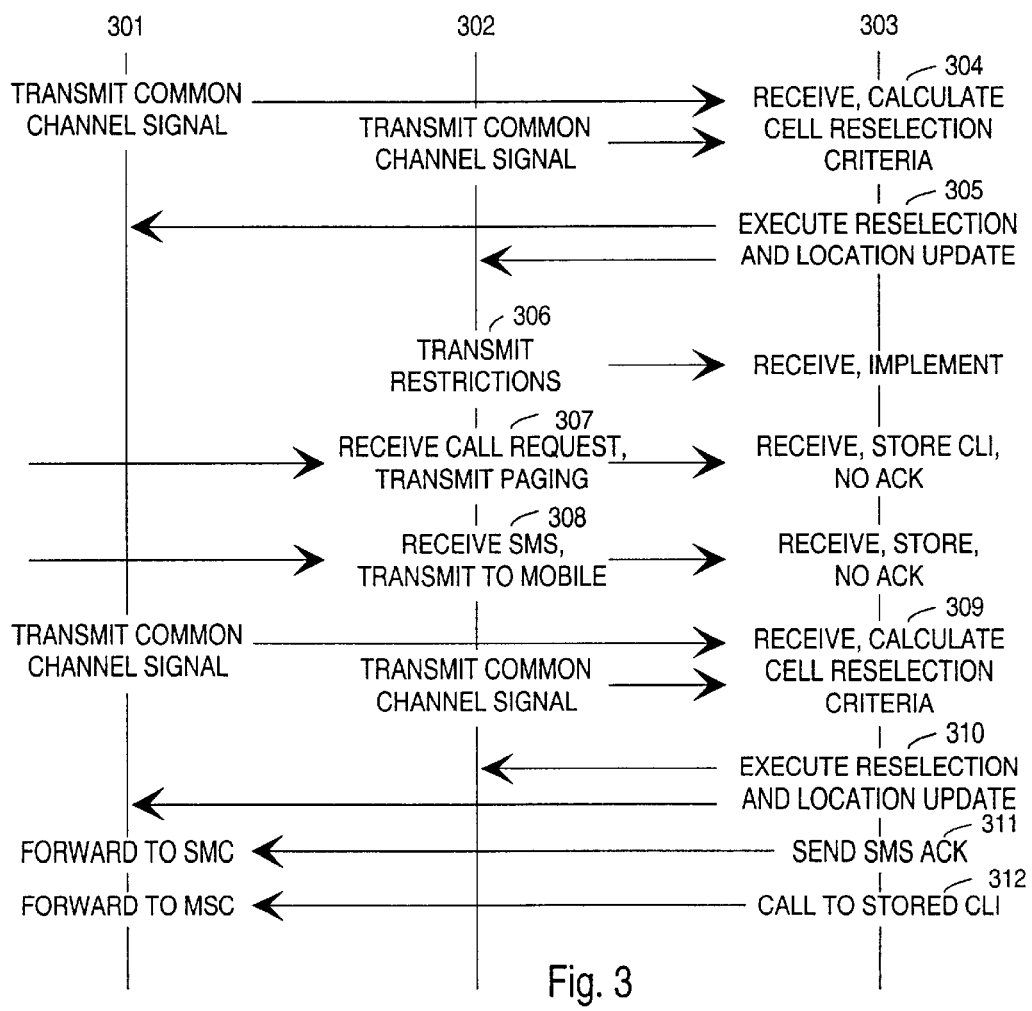
FIG. 3 is a flow diagram of a method according to the invention.

We will conclude the description by summarizing the operation according to some advantageous embodiments of the method according to the invention. FIG. 3 illustrates the operation of a regular base station 301, a beacon base station 302 and a mobile terminal 303. We will assume that a simple "beacon base station" embodiment of the invention is used and that once the mobile terminal has selected the cell of a beacon base station, it will be able to receive orders concerning the nature of the required restricted mode. Some terminology relating to the GSM system will be used with naturally no intention to limit the applicability of the invention.

At stage 304 the mobile terminal finds that the C1 parameter calculated for the beacon base station is positive and higher than that calculated for the regular base station, so the terminal reselects the cell of the beacon base station. Reselection and the associated location update is illustrated as the simple arrows at stage 305. At stage 306 the beacon base station transmits to the mobile terminal, preferably on a common channel, a command set describing the required restrictions. At stage 307 there is an attempted call from somewhere else to the mobile terminal, resulting in a paging message to be sent without the mobile terminal being able to acknowledge; the CLI of the caller will be stored in the memory of the mobile terminal. At stage 308 there is an SMS transmission from somewhere else. Again the SMS is conveyed to the mobile terminal and stored but it will not respond to the beacon base station in any way. At stages 309 and 310 a cell reselection to the cell of the regular base station indicates that the mobile terminal is leaving the restricted area. A delayed acknowledgement for the received SMS message is automatially sent through the regular base station to a Short Message Center (not shown) at stage 311, and the user, having seen the CLI of the attempted caller, will place a call to him at stage 312.

Figure 4:
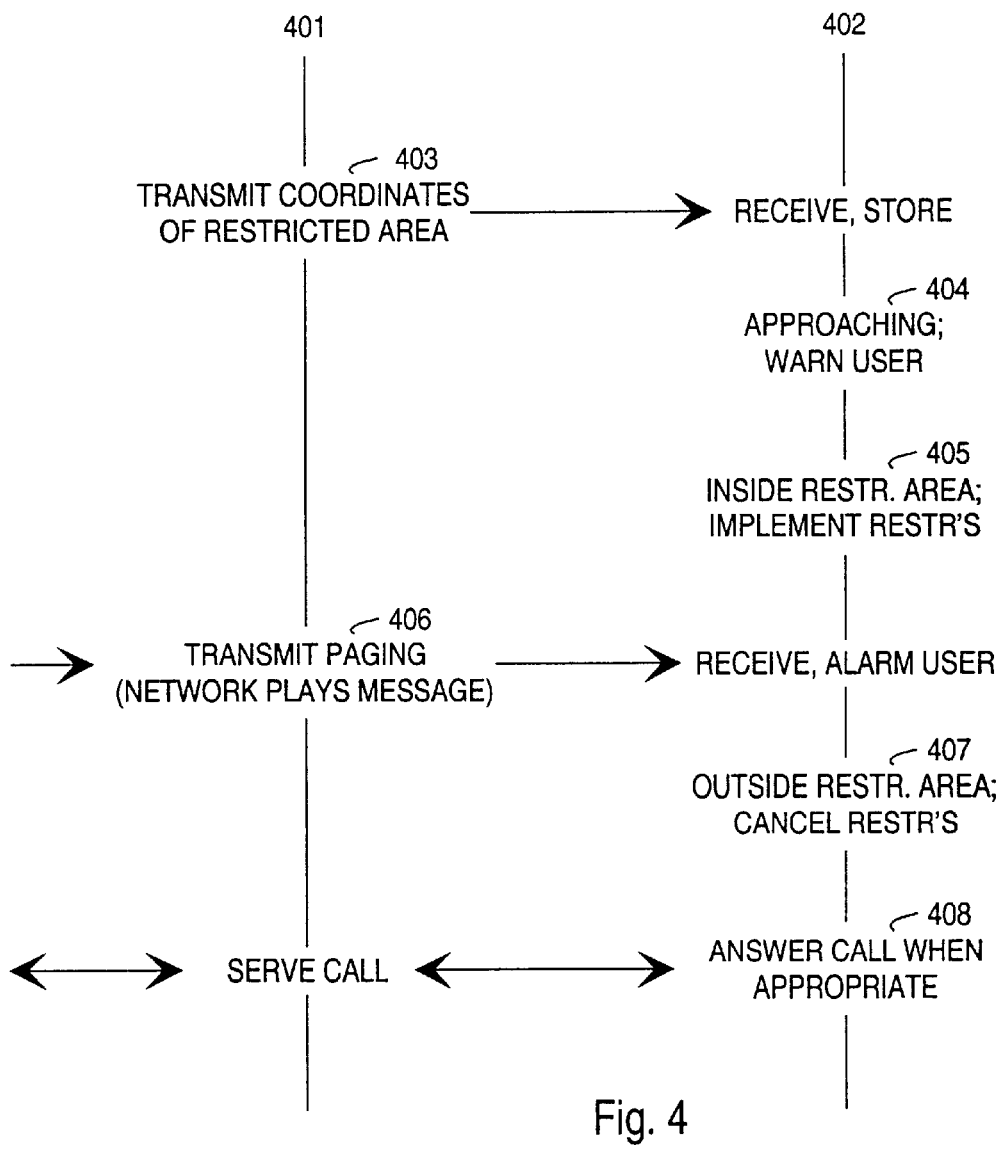
FIG. 4 is a flow diagram of another method according to the invention.

In FIG. 4 we will assume that the restricted area has been defined by means of coordinates. We will also assume the use of the mobile-based alternative discussed above. There is a regular base station 401 and the mobile terminal 402. At stage 403 the base station transmits, as a part of its regular common channel transmissions, the coordinates of the restricted area as well as some knowledge about which restrictions are to apply. The mobile terminal notices that it is approaching the border of the restricted area, so it displays a warning message to the user at stage 404. At stage 405 the mobile terminal finds its current location to fall within the restricted area, so it notices the base station and enters the restricted mode. At stage 406 there is an attempted call from somewhere else to the user of the mobile terminal. The base station will convey a paging message to the mobile terminal simultaneously with the network playing a voice-synthesized message to the caller, telling him that the called party is within a restricted area and asking him to wait. The user of the mobile terminal 402 has noticed the paging through e.g. seeing a blinking alarm message on a screen. He grabs his mobile terminal, leaves quickly the restricted area at stage 407 and answers the call at stage 408.

Figure 5:
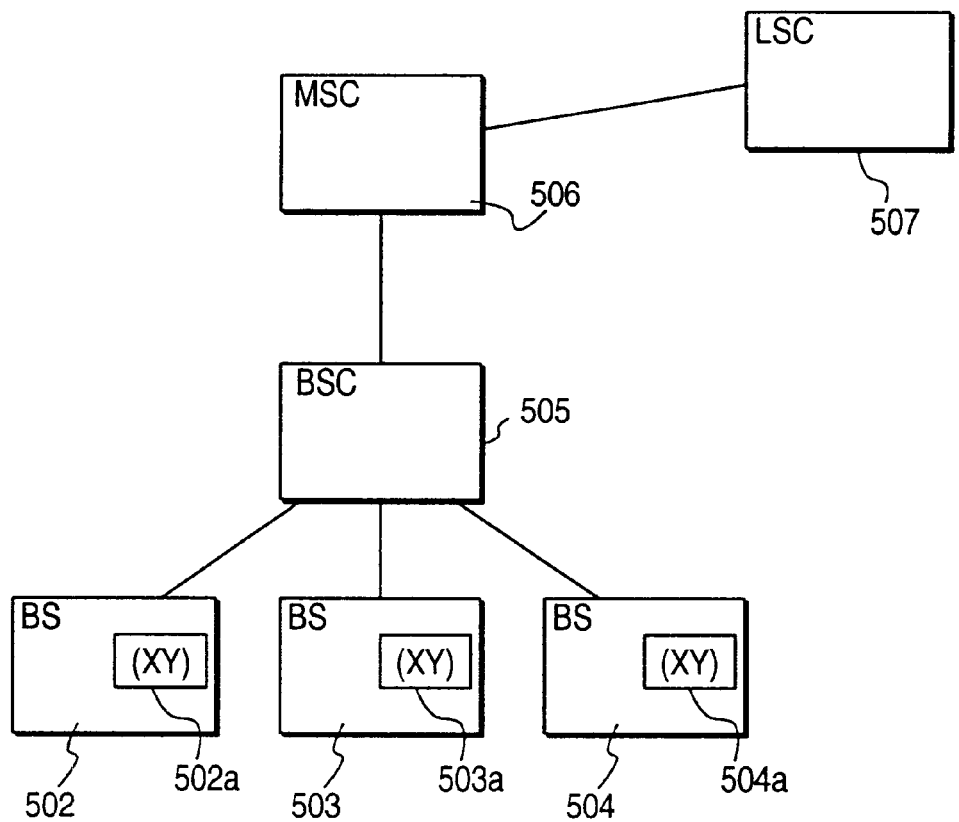
FIG. 5 illustrates a cellular radio system according to the invention.
Figure 5:

FIG. 5 is a schematic representation of a cellular radio system where the invention is to be applied. Here we assume that both the "beacon base station" and "coordinates" embodiments are used for defining restricted areas and that the beacon base station 501 is a dummy standalone transmitter. The system comprises also a number of regular Base Stations (BS) 502 to 504, a Base Station Controller (BSC) 505, a Mobile Switching Center (MSC) 506, a Location Service Center (LSC) 507 and within the mobile terminal 508 a location information block 509.

The beacon base station 501 comprises a common channel transmitter 501a for setting up a counterpart of the downlink common channels in the radio interface offered to the mobile terminals by the regular base stations 502 to 504 and facilitating cell reselection to the cell of the beacon base station. The common channel transmitter 501a is arranged to include into its transmissions a specific command that disables all channel access requests from the mobile terminals in its cell. The regular base stations 502 to 504 comprise, in addition to their previously known parts, a coordinate memory 502a to 504a for storing the coordinates of restricted areas. From its coordinate memory each regular base station regularly reads the coordinates of restricted areas so that it may include them into a specific broadcast message on a certain downlink common channel. When a mobile terminal is camping in the cell of one of the regular base stations 502 to 504, there is a signalling connection from the location information block 509 of the mobile terminal through the base station, the BSC 505 and the MSC 506 to the LSC 507 so that the location of the mobile terminal is known both in the terminal itself and the LSC. The location information block of the mobile terminal further has a connection to the main control block (not shown) of the mobile terminal so that the control block can provide the received and decoded coordinate information of restrictes ares to the location information block, and the location information block may inform the main control block about the potential need for restricting operation due to the mobile terminal being within a restricted area.

All references to certain present and/or future mobile telecommunication systems in the description above are exemplary and they do not limit the applicability of the present invention.

What is claimed is:

1. A cellular radio system comprising:

a multitude of base stations for offering a radio interface to mobile terminals for communicating general information to the mobile terminals and arranging for dedicated communication between a certain mobile terminal and the cellular radio system, and a certain first base station which has been previously appointed, prior to approach of a mobile terminal, as a beacon base station of an isolated, geographically defined restricted area, and which is located within or in the immediate vicinity of said restricted area, so that the cell of the beacon base station coincides with at least part of the restricted area, wherein said first base station is arranged to attract mobile terminals that are located within said restricted area to perform cell reselection into the cell of said first base station and to impose restrictions to the operation of mobile stations that have been attracted to the cell of said first base station.

2. A cellular radio system according to claim 1, comprising a predetermined number of beacon base stations located within or in the immediate vicinity of said restricted area so that the cells of the beacon base stations together define the restricted area.

3. A cellular radio system according to claim 1, comprising a communication connection between said beacon base station and the rest of the cellular radio system for transmitting location updates of the mobile terminals that enter the cell of the beacon base station, downlink call establishment requests for the mobile terminals that operate within the cell of the beacon base station, and other information relating to the operation of the beacon base station.

4. A cellular radio system according to claim 3, wherein in a case of a downlink call establishment request to a certain mobile terminal being transmitted to said beacon base station, the cellular radio system is arranged to reject the request by indicating that, although the mobile terminal to which the downlink call establishment request was directed to was known to operate within the cell of the beacon base station, establishment directly of a call connection to the mobile terminal is precluded.

5. A cellular radio system according to claim 3, wherein the operation of the beacon base station follows a predetermined schedule so that for one part of the time it functions without imposing restrictions to the mobile terminals operationing in its cell and for another part of the time it imposes restrictions to the mobile terminals operationing in its cell.

6. A cellular radio system according to claim 1, comprising a regular base station, the cell of which overlaps with the cell of the beacon base station, whereby those characteristics of said cells that affect cell reselection have been arranged in a way driving a mobile terminal entering the restricted area to reselect the cell of the beacon base station.

7. A cellular radio system according to claim 1, comprising, in the vicinity of the beacon base station, a number of regular base stations, the average transmission power of which are significantly higher than the transmission power of the beacon base station.

8. A cellular radio system according to claim 1, wherein the cellular radio system is arranged to prevent channel access requests from mobile terminals operating in the cell of the beacon base station by defining the access request channel in the cell of the beacon base station in such a way to preclude valid use of the cellular radio system for the mobile terminals.

9. A cellular radio system according to claim 1, comprising nested restricted areas for imposing a different set of restrictions to the operation of the mobile terminals at different parts of a certain area.

10. A cellular radio system according to claim 1, wherein the cellular radio system is arranged to answer a call establishment request to a certain mobile terminal known to operate within the restricted area by announcing to the sender of the call establishment request that the called party is within a restricted area.

11. A cellular radio system comprising:
   a multitude of base stations for offering a radio interface to mobile terminals for communicating general information to the mobile terminals and arranging for dedicated communication between a certain mobile terminal and the cellular radio system; and
   a certain first base station which is a beacon base station located within or in the immediate vicinity of an isolated, geographically defined restricted area, so that the cell of the beacon base station coincides with at least part of the restricted area;
   wherein said first base station is arranged to attract mobile terminals that are located within said restricted area to perform cell reselection into the cell of said first base station and to impose restrictions to the operation of mobile stations that have been attracted to the cell of said first base station; and
   the beacon base station is a standalone station with no communication connection between said beacon base station and the rest of the cellular radio system.

12. A cellular radio system according to claim 11, wherein said beacon base station is a board of a movable platform, especially an aircraft.

13. A method for restricting the operation of a mobile terminal within a certain area, comprising the steps of:
   providing a radio interface for the mobile terminal through a number of base stations;
   using said radio interface for general broadcasts on a common downlink channel;
   attracting mobile terminals that are located within a certain isolated, geographically defined restricted area to perform cell reselection into the cell of a certain first base station which has been previously appointed, prior to approach of a mobile terminal, as a beacon base station of an isolated, geographically defined restricted area and which is located within or in the immediate vicinity of the restricted area, so that a cell of the beacon base station coincides with at least part of the restricted area; and
   imposing, through the operation of said first base station, restrictions to the operation of mobile stations that have been attracted to the cell of said first base station.

14. A method according to claim 13, wherein the step of imposing restrictions to the operation of mobile stations comprises the substep of transmitting a command for the mobile terminals to switch off the mobile terminals.

15. A method according to claim 13, wherein the step of imposing restrictions to the operation of mobile stations comprises the substep of transmitting a command for the mobile terminals to refrain from transmitting access requests while within the restricted area.

16. A method according to claim 13, wherein the step of imposing restrictions to the operation of mobile stations comprises the substep of transmitting to those mobile terminals operating within the restricted area that request a dedicated channel a rejection regardless of the reservation situation of radio capacity in the serving base station.

17. A method according to claim 13, wherein the step of imposing restrictions to the operation of mobile stations comprises the substep of transmitting a command for the mobile terminals to limit acoustic emissions.

18. A method according to claim 13, wherein the step of imposing restrictions to the operation of mobile stations comprises the substep of transmitting a command for the mobile terminals to refrain from acknowledging downlink transmissions while within the restricted area.

* * * * *